United States Patent [19]
Bull et al.

[11] 4,084,859
[45] Apr. 18, 1978

[54] TOWED VEHICLE BRAKE

[75] Inventors: Jeffrey Lawrence Bull; Tanya Ellen Murphy; Laurence Ernest Gibson, all of Adelaide, Australia

[73] Assignee: Ian R. Murphy, Valley View, Australia; by said Tanya Ellen Murphy

[21] Appl. No.: 779,497

[22] Filed: Mar. 21, 1977

[30] Foreign Application Priority Data

Mar. 25, 1976  Australia ............................ PC5352/76

[51] Int. Cl.² .............................................. B60T 8/02
[52] U.S. Cl. .................................... 303/106; 188/3 R; 303/7; 303/20
[58] Field of Search .................. 180/105 E; 188/3 R, 188/181 C, 112, 181 R; 244/111; 303/7, 20, 24, 95, 97, 106, 93; 310/93, 94

[56] References Cited

U.S. PATENT DOCUMENTS

| 2,045,175 | 6/1936 | Baughman | 303/20 X |
| 2,389,051 | 11/1945 | Hines | 303/95 |
| 3,070,185 | 12/1962 | Fales | 303/95 X |
| 3,780,832 | 12/1973 | Marshall | 303/7 X |
| 3,832,010 | 8/1974 | Grosseau | 303/95 X |
| 3,917,356 | 11/1975 | Devlieg | 303/93 |
| 3,967,863 | 7/1976 | Tomecek et al. | 303/7 X |
| 3,981,542 | 9/1976 | Abrams et al. | 303/7 X |

*Primary Examiner*—Stephen G. Kunin
*Attorney, Agent, or Firm*—J. Harold Nissen

[57] ABSTRACT

A braking system for towed vehicles adapted for mounting on the towed vehicle which comprises, electrical slave apparatus to apply the brakes proportionally to applied current, and actuated under control of a speed sensing device which generally increases braking force in proportion to increase in the speed of the vehicle as determined by the speed sensing device, the braking being initiated by the braking system of the vehicle.

3 Claims, 2 Drawing Figures

TOWED VEHICLE BRAKE

This invention relates to a towed vehicle brake which is useful, for example, for a caravan or a trailer.

Caravans and trailers originally utilized "overrun" brakes wherein relative movement between the towing and towed vehicles resulted in application of a force to brake shoes on the towed vehicle. This was effective for light loads, but it is ineffective for heavy loads and power braking of some type is sometimes required. The most commonly used power braking is the vacuum brake type, although some installations have utilised power hydraulic braking coupled to the towing vehicle. Both of these however, are costly, and there is an absence of control such as will, for example, inhibit skidding of the towed vehicle.

The main object of this invention is to provide an improved brake control means for a towed vehicle, and which will be effective yet relatively low cost and can be mounted on the towed vehicle with a simple activating connection to the brake light circuit of the vehicle.

A second object is to provide an improved arrangement which will reduce risk of skidding and yet apply a satisfactory braking effect.

A further object is to provide a brake wherein the braking force is related to the speed of the vehicle.

A still further object is to control the braking according to the "rate of speed change" of the vehicle.

Electric brakes are already known, wherein a magnetic force is applied to a shoe which engages a complementary surface on a rotating member, and in this invention use is made of magnetic brakes.

Among the known magnetic brakes suitable for this purpose is one in which a magnetic coil is mounted on a lever which in turn expands the brake shoes into engagement with the drum, the magnetic coil being so mounted that it can electrically engage the revolving brake drum to supply the braking force to the shoes, the magnetic coil thus acting as a servo device and applying power from the rotating drum to the lever in proportion to the strength of the current flowing in the coil.

The mere "on-off" control of a magnetic brake is unsuitable for a towed vehicle, and in this invention there is provided a vehicle brake having a magnetic coil actuating a braking member which is cooperable with a complementary surface on a rotating member, the electric sensor has an output proportional to the speed of the towed vehicle, a speed sensing device being associated preferably with a wheel of the towed vehicle, but any speed sensing device may be used.

According to our invention, by sensing the rotational speed of a vehicle wheel, or by using other speed recording mechanism, it is possible to impart a controlled voltage to the magnetic brake solenoid by measured deceleration.

By sensing the "rate of change" braking can be controlled and this invention thus envisages a braking system which has as its brake control a device which operates the brake proportionally to deceleration.

In the preferred form of the invention, pulses which are directly proportional to the speed of the vehicle, are integrated into a D.C. voltage fed into one input of a voltage comparator, which causes the output pulse width of the comparator to vary in accordance with the input voltage and controls the current flowing in the magnetic braking control coil.

In order however that the invention may be more fully appreciated embodiments thereof will now be described with reference to the accompanying drawings in which.

Figure 2:
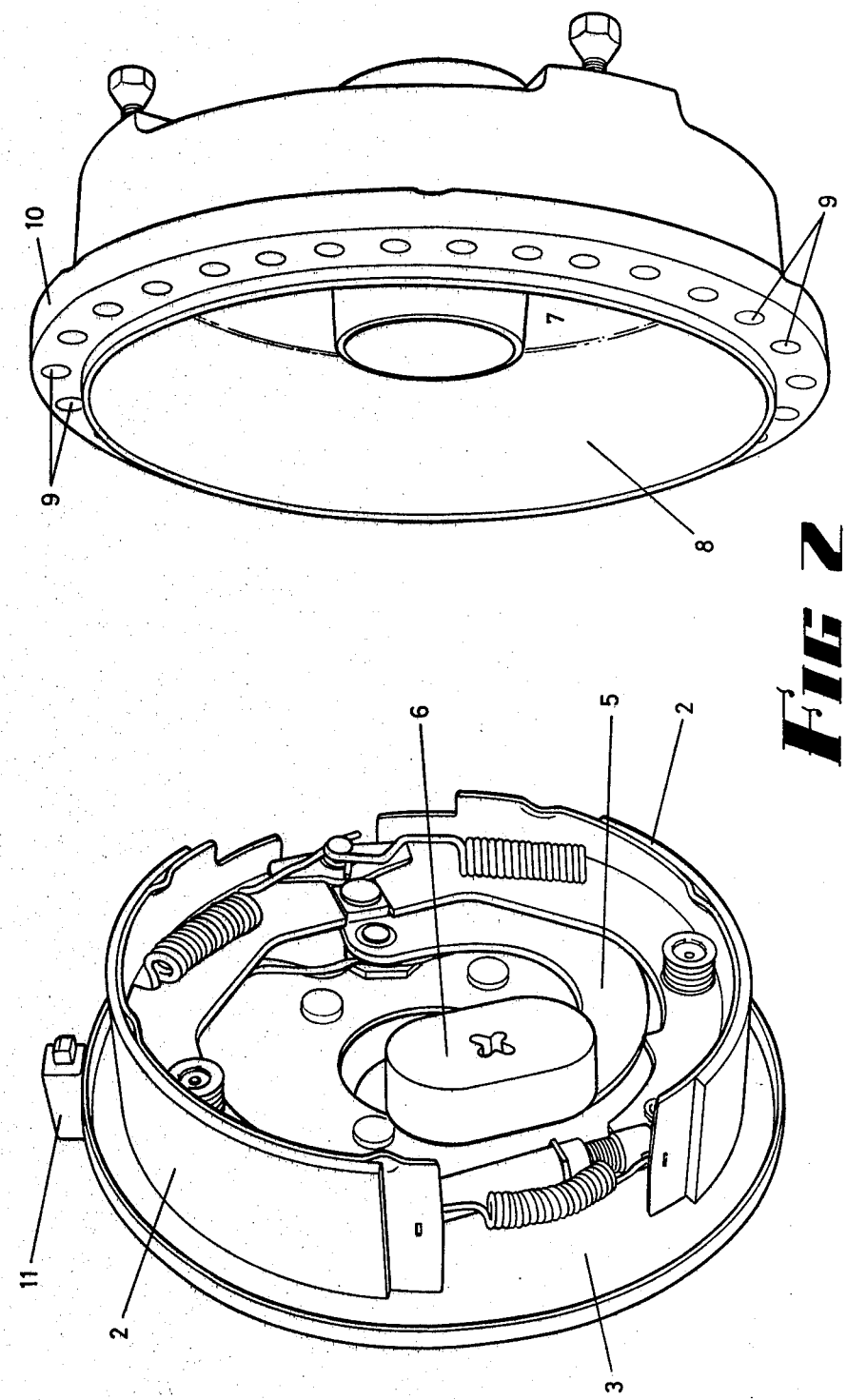
FIG. 2 is a perspective view of the brake assembly incorporating a sensor, the brake drum assembly being shown separated from the brake shoe assembly.

The brake assembly of FIG. 2 comprises a pair of shoes 2, carried on a housing 3 which also supports the brake expander shaft 4 to which is attached a lever 5 having on it an electromagnet 6 which is disposed adjacent the wall 7 of the brake drum 8 whereby the electromagnet is pulled around by the brake drum wall 7 when energised to act as a servo to apply the brakes.

The sensor comprises a series of spaced magnets or bars 9 on a ring 10 of polymeric or alloy material which is integral with the brake drum, and these are in line with sensor 11 supported on the brake shoe housing 3 so that the sensor 11 has impulses generated in it as the wheel and brake drum 8 rotate. This gives a frequency proportional to speed.

Figure 1:
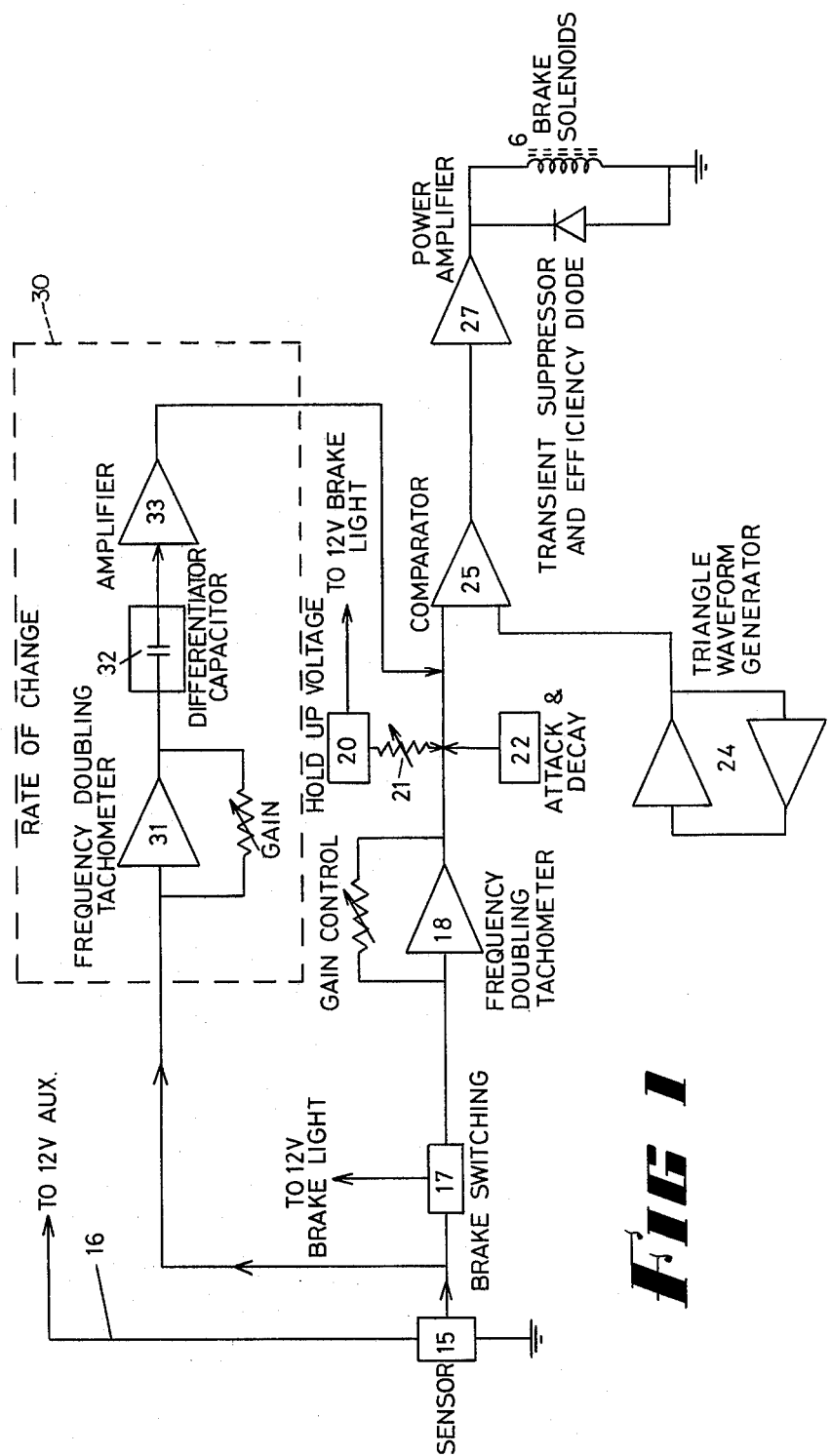
FIG. 1 is a schematic diagram illustrating the invention incorporating the "rate of change" control.

Referring now to the schematic diagram of FIG. 1 and the functions of the various integers thereof:-

SENSOR 15

While this can be in the form of a photodetector, vane oscillator, induction coil or magnetic detector, the basis of such a device being to measure relative speed and a rate of change of speed of a rotating object, the sensor 15 in this case comprises the "Hall Effect" device 11 on the brake shoe housing 3 which is adjacent to the plurality of magnets 9 embedded in the band of polymeric or alloy material 10 carried on the outer periphery of the brake drum 8.

The sensor monitors relative speed and changes of speed at all times whilst power is applied to the towed vehicle via the auxilliary power line 16.

BRAKE SWITCHING MECHANISM 17

The brake switching mechanism 17 is operated by the brake light circuit of the towing and towed vehicle, its operation being to cause the comparator circuit to allow power to flow to the brake solenoid.

FREQUENCY DOUBLING TACHOMETER 18

Electrical pulses from the sensor are doubled in the frequency doubling tachometer and then integrated into a pulsed D.C. output which is proportional to the frequency of the electrical pulse coming in, the band width of which in turn is proportional to speed of the vehicle.

Thus the tachometer 18 gives a conversion of relative speed to electrical pulses whose frequency is proportional to speed, and the electrical pulses are then converted to a D.C. Voltage which is also proportional to speed.

HOLD UP VOLTAGE DEVICE 20 (optional)

Current for this is derived from the brake light circuit and may comprise a set resistor to bring on a minimum set amount of braking at all times when the brakes are activated, it having a control 21.

ATTACK AND DECAY CIRCUIT 22 (optional)

An R.C. network is used to obtain smooth on and off operation of brake, and this device comprises resistors and a capacitor to adjust the delay of the signal to the comparator.

TRIANGLE WAVEFORM GENERATOR 24

A triangle or sawtooth waveform is generated so that power to the brake can be pulse width modulated depending on the power required.

COMPARATOR 25

This has the differentiated voltage applied to one input which is proportional to deceleration, and the triangle waveform from the generator 24 to the other input. The output of the comparator is an electrical pulse whose frequency is determined by the waveform generator and whose pulse width is determined by the relative deceleration of the vehicle.

POWER AMPLIFIER 27

This amplifies the above pulse to a quantity of power sufficient to operate the braking system of the vehicle and the output of this amplifier is pulsed current which is fed to the brake solenoid 6.

EFFICIENCY DIODE 28

Allows recirculating currents in brake solenoid as well as suppression of switching transients.

RATE OF CHANGE CIRCUIT 30

The prime function of this is to measure decreases in speed to apply the required amount of power to the brake system to accommodate that condition.

Command for this circuit is determined by the driver of the towing vehicle who will be able to initiate this current and control the amount of brake required by control of the braking of the towing vehicle.

The operation of the "rate of change" circuit is as follows: electrical pulses from the sensor 15 are fed to a frequency doubling tachometer 31 which continually monitors speed and more importantly relative changes in speed. By differentiating the output of the tachometer in a capacitor 32 it is possible to detect all relative frequency shifts or changes in speed. The output of the differentiator capacitor 32 is fed to an operational amplifier 33 which is connected such that relative decreases in speed are detected. The sensitivity point at which detection of decrease in speed is achieved is adjustable. The resultant signal is amplified and fed to the comparator 25 and hence to the brake solenoid 6. A variation in power applied to the braking system is achieved dependent upon the amount of deceleration initiated by the towing vehicle.

By this device it is possible to measure relative changes in frequency and hence speed. This information can then be used to operate the entire brakes operation by connecting to the comparator 25 or to only operate the brakes under severe braking, by connecting to the power amplifier 27.

We claim:

1. A braking system for towed vehicles in which the towed vehicle has electrically energised brakes which comprises,
    (a) electrical slave means including a solenoid on the brakes of the towed vehicle to apply the said brakes proportionally to current applied to said solenoid,
    (b) a speed sensing device mounted on at least one wheel of the said towed vehicle, said speed sensing device comprising an electrical sensor to produce pulses in proportion to the speed of rotation of said wheel,
    (c) a "rate of change" circuit connected between the said speed sensing device and the said slave means on the brakes arranged to measure the frequency of the pulses of the speed sensing device and to increase braking force in proportion to a rate of decrease in the number of pulses as determined by the speed sensing device, said electrical means comprising a frequency doubler tachometer receiving said pulses, a wave form generator, a comparator receiving pulses from the said frequency doubler and the said wave form generator, and a power amplifier receiving the signal from the said comparator and applying pulsed direct current to the said solenoid in proportion to the frequency of the pulses generated in the said sensor, and
    (d) a switch in the said electrical connecting means between the sensor and the brake solenoid to initiate braking when said switch is energised by the brake light circuit of the vehicle.

2. A braking system according to claim 1 wherein a "hold up voltage" is applied before said power amplifier to apply a predetermined braking force irrespective of the said sensor signal.

3. A braking system according to claim 1 characterised by a filter network before the power amplifier to control the attack and decay of braking.

* * * * *

UNITED STATES PATENT AND TRADEMARK OFFICE
CERTIFICATE OF CORRECTION

PATENT NO. : 4,084,859
DATED : April 18, 1978
INVENTOR(S) : Jeffrey Lawrence Bull et al It is certified that error appears in the above-identified patent and that said Letters Patent are hereby corrected as shown below:

IN THE ABSTRACT, Line 3, from the end of the abstract change "increase" to --relative decrease--.

Signed and Sealed this

Twentieth Day of February 1979

[SEAL]

Attest:

RUTH C. MASON
Attesting Officer

DONALD W. BANNER
Commissioner of Patents and Trademarks